TAPE OR FILM SPOOL

Filed Aug. 15, 1967 Sheet 1 of 2

Inventor:
Pierre A. L. Posso
By: Spencer & Kaye
Attorneys

Inventor:
Pierre A. L. Posso
By: Spencer & Kaye
Attorneys

United States Patent Office 3,438,592
Patented Apr. 15, 1969

3,438,592

TAPE OR FILM SPOOL

Pierre A. L. Posso, 20 Rue Gandon, Paris 13, France

Filed Aug. 15, 1967, Ser. No. 660,794
Claims priority, application France, June 30, 1967, 112,645
Int. Cl. B65 75/18
U.S. Cl. 242—71.8 12 Claims

ABSTRACT OF THE DISCLOSURE

A spool for magnetic tape or cinematographic film is composed of a cylindrical hub and two circular plates of plastic material, the hub and plates being assembled to form the spool. The hub has oppositely facing lateral surfaces and in each surface is an annular groove or throat. Each groove or throat is formed with spaced lugs. Each circular plate has a flange formed with spaced lugs. The various lugs and spaces are so dimensioned that a respective flange may fit in a respective groove or throat, with the lugs interengaging.

This invention relates to spools for magnetic tape and cinematographic film.

Certain spools are designed to contain a very large length of magnetic tape and are capable of being driven at high speed. They are thereby subjected to high internal tensions and are therefore required to have a relatively high resistance. Moreover, their geometrical form must be constructed with high precision because otherwise the magnetic tape is liable to deteriorate or even tear.

These known spools comprises three distinct elements which are rendered integral by assembly, these elements consisting tof two plates of plastic material and a monolithic hub which has a prefectly cylindrical surface for the band. The hub is made of light alloy and is I-shaped in section. The arms of this I constitute on the outside the surface for the cylindrical band and on the inside the cylindrical entrainment surface. The central part of this I is a thin sheet which has perforations for the passage of lugs which are integral with the two lateral plates and which are superimposed upon each other and stuck together.

This known construction is satisfactory for the purpose for which the spool is intended but it has numerous disadvantages. Above all, the hub is very difficult to obtain by shell molding or molding under pressure since the metal has difficulty in filling the thin parts of the mold, especially since the stems which delimit the perforations in the core oppose the filling of the metal. In practice, molding must be carried out under vacuum in order that the hub may reach its full extent. This technique is very difficult and consequently the cost of the hub of the spool is relatively high. Moreover, the precision achieved is insufficient and the part must therefore be machined after moulding, which still further increases the cost.

It is the object of the present invention to overcome these two disadvantages by producing a hub in which the form and mode of connection to the plates are such that this hub can easily be obtained by molding a light alloy under pressure or by injecting a plastic material, sufficient precision being achieved in the form and dimensions to obviate any subsequent machining. Furthermore, the resistance of the spool obtained is excellent, as is also its balance. Lastly, there is no risk of deterioration of the magnetic tape or cinematographic film it contains when these are wound or unwound at high speed.

According to the invention, the hub presents on each of its lateral surfaces an annular throat into which project plates in the form of circular sectors separated by notches provided for the passages of other lugs which are integral with a flange of the corresponding plate, this flange being normally engaged in the throat of the hub and its lugs being applied behind those of the said hub.

Various other features of the invention will appear from the detailed description which follows.

Embodiments of the object of the invention are shown by way of non-limiting examples in the attached drawing.

Figures 1, 2:
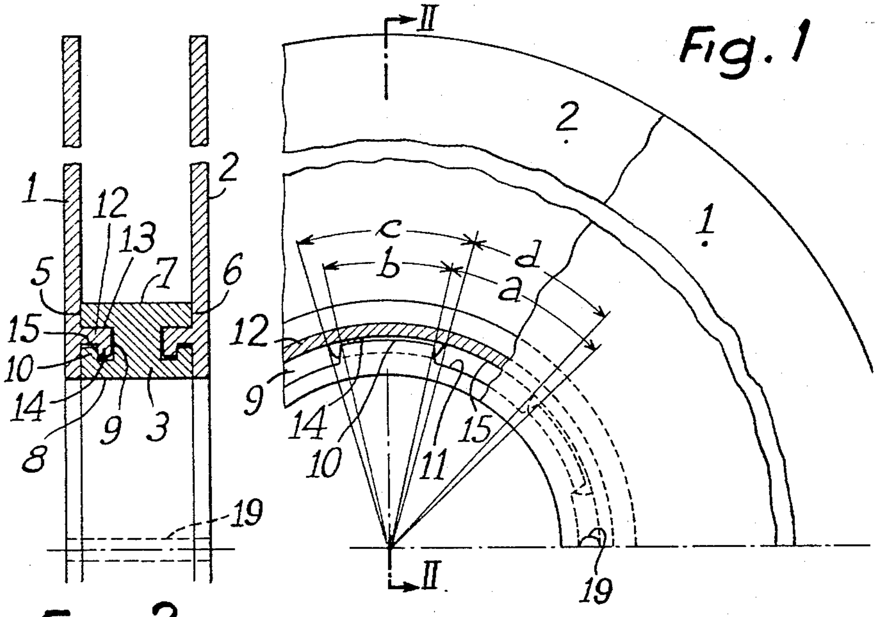
FIGURE 1 is a partial view of the spool according to the invention in which a part has been broken away at the level of the lateral surface of the hub.
FIGURE 2 is a half section taken on the line II—II in FIGURE 1.

1 and 2 denote the two plates of the spool and 3 its hub. The plates are made of plastic material. The hub consists either of a light metal alloy (FIGURES 2, 4 and 5) moulded under pressure or of a plastic material injected under pressure and covering an internal metal armature 4 (FIGURE 3) which is preferably double Y-shaped in section and imparts to it increased strength and excellent stability.

The hub 3 is all in one piece and delimited by two lateral surfaces 5 and 6, a perfectly cylindrical external surface 7 for holding the tape or film and an internal entrainment surface 8 which is also cylindrical.

According to the first embodiment shown in FIGS. 1 and 2, the hub has an annular throat 9 in the lateral surface 5 against which the plate 1 bears. Lugs 10 in the form of circular sectors project into this throat from the centre to the periphery. These lugs are separated by notches 11 of which the angular opening $a$ is larger than $b$ of the lugs 10.

The plate 1 carries a flange 12 which, when the spool is assembled (FIGURE 2), engages in the throat 9 and extends between a cylindrical centering surface 13 of the latter and the lugs 10. This flange 12 is integral with the lugs 14 which also are in the form of circular sectors but arranged in the opposite direction to the lugs 10, that is to say from the periphery to the center. The lugs 14 are situated behind the lugs 10 and thus separated from the plate 1 by a groove 15 the width of which is equal to that of the said lugs 10. The lugs 14 are separated by notches 15 and their spacing is exactly the same as that of the lugs 10. Moreover, the angular extent $c$ of the lugs 14 is less than the opening $a$ of the notches 11 but greater than $b$ of the lugs 10. Moreover, the angular extent $d$ of the notches 15 is greater than $b$ of the lugs 10.

It follows from what has been said above that in order to mount the plate 1 on the hub 3, all that is necessary is to place the lugs 14 opposite the notches 11 and the lugs 10 opposite the notches 15 and then engage the flange 12 in the throat 9 until the plate 1 bears against the lateral surface 5 of the hub, and then to move the lugs 14 behind the lugs 10 by relative rotation.

The two plates 1 and 2 may be identical, and in that case the hub 3 has the same form on its surface 6 as on its surface 5 (FIGURES 1 and 2).

On the other hand, in certain cases, especially if one of the plates is to carry a pickup, the hub 3 must not be symmetrical.

Figure 3:
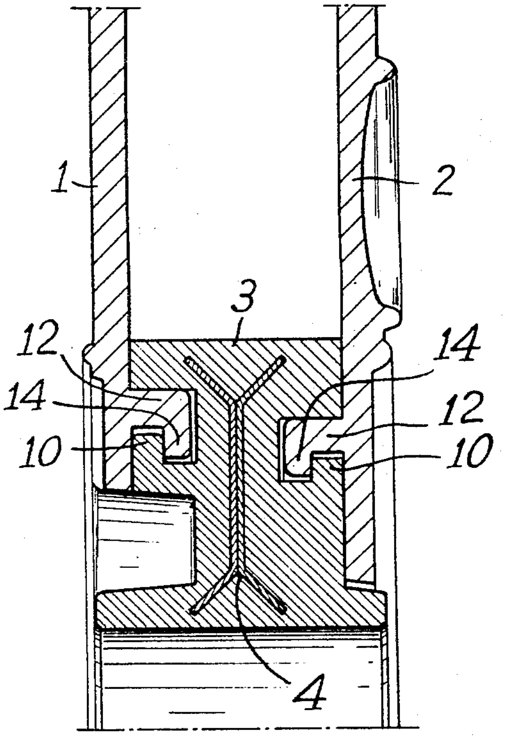
FIGURES 3 to 5 are partial sections analogous to FIGURE 2 and drawn to a larger scale, showing other embodiments of the spool.

In the embodiment shown in FIGURES 2 and 3, the lugs 10 situated on either side of the hub are directed towards the periphery and the lugs 14 of the plates 1 and 2 towards the centre. This is not obligatory.

Figures 4, 5:
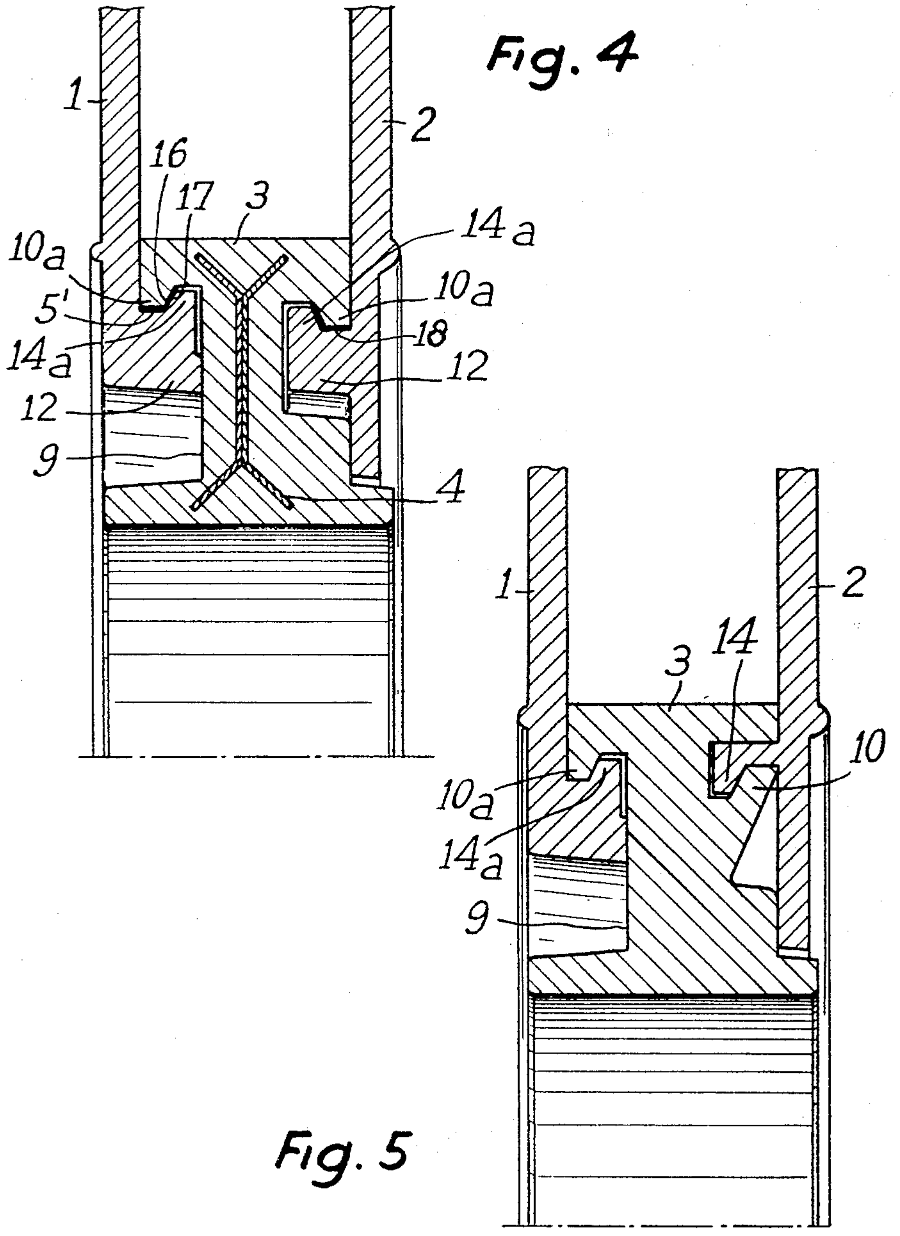

According to another embodiment illustrated in FIGURE 4, the lugs 10$a$ of the hub situated on either side are directed towards the center while the lugs 14$a$ of the plates 1 and 2 are directed towards the periphery. It is not necessary to have the same arrangement on both plates of the hub. As shown in FIGURE 5, the plate 1 may have lugs 14*a* directed towards the periphery and cooperating with lugs 10*a* of the hub directed towards the center while the plate 2 may comprise lugs 14 directed towards the center and cooperating with lugs 10 of the hub 3 directed towards the periphery.

Moreover, in the embodiment illustrated in FIGURES 2, 3 and 5, the centering surfaces 13 provided in the hub 3 for the plates 1 and 2 consist of a cylindrical wall of the throat 9, which wall cooperates with the flank of the flange 12, which flank is also cylindrical. The centering surface may, however, also be formed, as shown in FIGURES 4 and 5, between the crests of the lugs 10*a* of the hub 3 and the base of the grooves 5' separating the lugs 14*a* of the plates. In the latter case, centering is also effected by the inclined internal surface 16 of the plates 10*a* of the hub and the cooperating external surface 17 of the lugs 14*a* of the plates.

The inclined surfaces 16 and 17 thus constitute locking surfaces whereby the plates 1 and 2 can be applied more firmly against the hub, and consequently these surfaces may have truncated cone form or even helicoidal form, as shown in the drawing.

In any case, when the plates 1 and 2 have been mounted in the manner described above on the hub 3, they bear against one another by way of the surfaces of contact. These may be solely the lateral surfaces 5 and 6 of the hub on the one hand and the internal surfaces of the plates 1 and 2 on the other (FIGURES 2 and 3) but they may also be formed in addition by the base of the throats 9 and the corresponding surface of the flanges 12 (FIGURES 4 and 5). In both cases, to these surfaces of contact are added those established between the lugs 10 and 14.

The plates and the hub are integral with each other and this may be effected by various means such as screws or rivets or simply by glue 18 (FIGURE 4) or the like interposed between the above mentioned surfaces of contact.

Further, since the charge spool is subjected to high forces of inertia, it may be advantageous to connect the plates 1 and 2 to the hub 3 by means of at least one coupling member. This may for example be a peg 19 (FIGURE 2) extending across the core of the hub or its armature 4 as well as across the flanges 12 of the plates.

The invention is not limited to the embodiment shown and described in detail but may cover various modifications without departing from its scope.

I claim:

1. Spool for magnetic tape or cinematographic film having three separate elements rendered integral by assembly, said elements comprising two plates of plastic material and a hub with a cylindrical external surface for receiving said tape or said film, wherein:

(a) each of the plates has a flange and each flange has lugs in the form of arcuate sectors;

(b) the hub has oppositely facing lateral surfaces each formed with an annular throat;

(c) lugs on said hub in the form of arcuate sectors project into the throat;

(d) notches separate said lugs on said hub for passage of the lugs on said flanges of said plates; and (e) each of said flanges normally engages in said throat with said other lugs behind said lugs of said hub.

2. Spool according to claim 1, wherein the angular extent of said lugs of said hub is less than that of said notches and less than that of said other lugs.

3. Spool according to claim 1, wherein the hub is formed with a centering surface for each of said plates.

4. Spool according to claim 3, wherein each said centering surface is substantially cylindrical and comprises a wall of each said throat, said flange of a respective plate having a wall opposite and adapted to cooperate with said wall of said throat.

5. Spool according to claim 1, wherein a locking surface is formed on the internal surface of each said lug of said hub, said locking surface being adapted to cooperate with an external surface of each said lug of a respective plate.

6. Spool according to claim 5, wherein said locking surface is in the shape of a truncated cone.

7. Spool according to claim 5, wherein said locking surface is helicoidal.

8. Spool according to claim 1, wherein said hub and said plates are connected by at least one coupling member.

9. Spool according to claim 8 wherein said coupling member is a peg.

10. Spool according to claim 1, wherein said hub and said plates are connected by a bonding agent.

11. Spool according to claim 1, wherein said hub is made of a light alloy.

12. Spool according to claim 1, wherein said hub is made of plastic material reinforced by a metallic member embedded in said plastic material.

References Cited

UNITED STATES PATENTS

| | | | |
|---|---|---|---|
| 864,063 | 8/1907 | Bauer | 242—118.61 X |
| 1,858,586 | 5/1932 | Goldberg et al. | |
| 3,041,005 | 6/1962 | Wallace | 242—116 |
| 3,211,392 | 10/1965 | Mohr. | |

NATHAN L. MINTZ, *Primary Examiner.*